United States Patent Office 2,931,693
Patented Apr. 5, 1960

2,931,693

SILICON AZO DYESTUFF AND FIBERS DYED THEREWITH

Donald L. Bailey, Snyder, and Ronald M. Pike, Grand Island, N.Y., assignors to Union Carbide Corporation, a corporation of New York No Drawing. Application April 29, 1957
Serial No. 655,501

7 Claims. (Cl. 8—8)

This invention relates to silicon-containing dyestuffs as new compositions of matter, and to processes for producing them. More particularly, this invention is concerned with silane azo dyestuffs.

The silane azo dyestuffs of the present invention contain the unit represented by the following general formula:

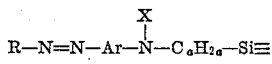

wherein R represents an aryl radical or a substituted aryl radical, as, for example, phenyl, naphthyl or anthraquinone radicals or substituted phenyl, naphthyl or anthraquinone radicals, such as chlorine-, hydroxy-, methoxy-, lower alkyl-, methyl-, sulfo-, sulfonamide, unsubstituted arylazo-, substituted arylazo-, phenyl-, nitro- and acylamino-substituted phenyl or naphthyl radicals, and the like; Ar represents an arylene radical such as phenylene and naphthylene radicals and including substituted phenylene or naphthylene radicals; X represents a hydrogen atom or an alkyl radical; and (a) is an integer having a value of at least 3, and preferably of from about 3 to about 5. Substituents on the Ar radical may be lower alkyl radicals, alkoxy radicals, nitro radicals, halogen atoms, sulfo radicals, and the like.

The novel monomeric silane azo dyestuffs herein disclosed and claimed can be represented by the following general formula:

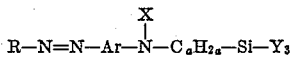

wherein R, Ar, X and (a) have the same meanings as hereinbefore indicated; and Y represents an alkyl radical such as methyl, ethyl, propyl, and the like, an aryl radical such as phenyl, an alkoxy radical such as methoxy, ethoxy, propoxy, and the like, or an aryloxy radical such as phenoxy.

The valuable dyestuffs of this invention are produced by coupling the diazonium salt of an aromatic primary amine with a reactive arylaminoalkylsilane, which can be represented by the general formula:

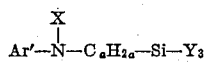

wherein Ar' represents an aryl radical or a substituted aryl radical, as, for example, phenyl or naphthyl radicals, or substituted phenyl or naphthyl radicals containing substituents on the aryl ring, such as lower alkyl-, alkoxy-, nitro-, halogen-, or sulfo- radicals; and X, Y and (a) have the same meanings as hereinbefore indicated; and wherein the position para to the amino nitrogen atom in the arylaminoalkylsilane is open and reactive.

The arylaminoalkylsilanes suitable as coupling components in this invention, and processes for their production, are the subject matter of our copending patent application, Serial No. 615,463, filed October 12, 1956. These arylaminoalkylsilanes can be produced by reacting an arylamine with an haloalkylsilane or an aminoalkylsilane, as represented by the following general equation:

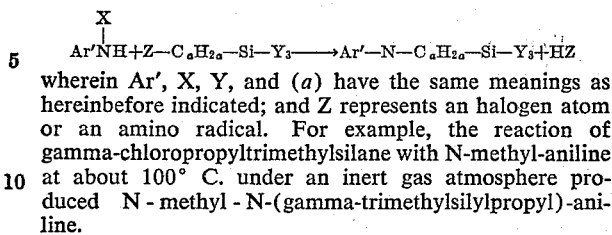

wherein Ar', X, Y, and (a) have the same meanings as hereinbefore indicated; and Z represents an halogen atom or an amino radical. For example, the reaction of gamma-chloropropyltrimethylsilane with N-methyl-aniline at about 100° C. under an inert gas atmosphere produced N - methyl - N-(gamma-trimethylsilylpropyl)-aniline.

The production of the silane azo dyestuffs of this invention can be illustrated by the following general equation:

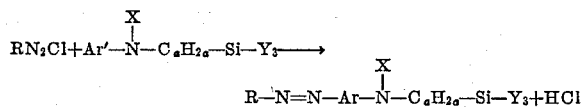

wherein R, Ar', Ar, X, Y and (a) have the same meanings as hereinbefore indicated.

The amino compounds suitable for use as starting materials in the production of the diazonium salts which can be used in this invention are the substituted and unsubstituted primary aryl amines which can be diazotized by procedures well known in the art. Illustrative are the primary monoamines of the benzene, naphthalene, or anthraquinone series; the monoamines of aminoazo dyestuffs; or the diamines of the benzene, napthalene, or biphenylene series. In producing dyestuffs with tetrazonium salts obtained from diamines, for example, from the tetrazos obtained from 3,3'-dimethoxy-4,4'-diaminodiphenyl or 4,4'-diaminodiphenyl, it is possible to couple both diazonium groups with two moles of an arylaminoalkylsilane, or to couple one diazonium group of the tetrazo with one mole of an arylaminoalkylsilane and the other diazonium group with a second mole of a conventional silicon-free coupling component.

Illustrative of the aromatic amino compounds that can be used in the preparation of diazonium salts suitable for use in this invention may be mentioned:

Aminobenzene,
1-aminobenzene-3-sulfonic acid,
1-aminobenzene-4-sulfonic acid,
1-aminobenzene-2-carboxylic acid,
1-aminobenzene-3-carboxylic acid,
1-aminobenzene-4-carboxylic acid,
1-amino-2-methylbenzene,
1-amino-3-methylbenzene,
1-amino-4-methylbenzene,
1-amino-2,4-dimethylbenzene,
1-amino-2,5-dimethylbenzene,
1-amino-2-chlorobenzene,
1-amino-4-chlorobenzene,
1-amino-2,5-dichlorobenzene,
1-amino-2,5-dichlorobenzene-4-sulfonic acid,
1,4-diaminobenzene-3-sulfonic acid,
1,4-diaminobenzene-3-carboxylic acid,
4-acetylamino-1-aminobenzene,
4-carbethoxyamino-1-aminobenzene,
4-benzoylamino-1-aminobenzene,
4-amino-1,1'-azobenzene,
4,4'-diamino-1,1'-azobenzene,
4-amino-4'-hydroxy-1,1'-azobenzene-3'-carboxylic acid,
4-amino-4'-hydroxy-1,1'-azobenzene-3'-carboxy - 5' - sulfonic acid,
1-amino-4-hydroxybenzene-3-carboxylic acid,
1-amino-4-hydroxybenzene-3-carboxy-5-sulfonic acid,
4,4'-diaminodiphenyl,
3,3'-dimethyl-4,4'-diaminodiphenyl,
3,3'-dimethoxy-4,4'-diaminodiphenyl, 3,3'-dichloro-4,4'-diaminodiphenyl,
4,4'-diaminodiphenyl-3-sulfonic acid,
4,4'-diaminodiphenyl-3,3'-disulfonic acid,
4,4'-diaminodiphenyl-3,3'-dicarboxylic acid,
1-amino-4-(4'-amino-benzoylamine)-benzene,
4,4'-diaminodiphenylurea,
4,4'-diaminostilbene-2,2'-disulfonic acid,
4,4'-diaminodiphenylamine,
4,4'-diaminodiphenylmethane,
4,4'-diaminodiphenylsulfone,
1-(4'-aminophenyl)-3-methyl-5-pyrazolone,
1-(3'-aminophenyl)-3-methyl-5-pyrazolone,
2-aminoanthraquinone,
2-aminonaphthalene,
1-aminonaphthalene-5-sulfonic acid,
1-aminonaphthalene-7-sulfonic acid,
2-aminonaphthalene-6-sulfonic acid,
2-aminonaphthalene-3,6-disulfonic acid,
2-aminonaphthalene-4,8-disulfonic acid,
2-aminonaphthalene-5,7-disulfonic acid,
2-aminonaphthalene-6,8-disulfonic acid,
1-aminonaphthalene-3,6-disulfonic acid,
1-aminonaphthalene-3,8-disulfonic acid,
1-amino-8-hydroxynaphthalene-4-sulfonic acid,
2-amino-5-hydroxynaphthalene-7-sulfonic acid,
2-amino-8-hydroxynaphthalene-6-sulfonic acid,
1-amino-8-hydroxynaphthalene-6-sulfonic acid,
1-amino-8-hydroxynaphthalene-2,4-disulfonic acid,
1-amino-8-hydroxynaphthalene-3,6-sulfonic acid,
2-amino-8-hydroxynaphthalene-3,6-disulfonic acid,
2-amino-1-carboxybenzene-4-sulfonic acid,
2-amino-1-carboxybenzene-5-sulfamide,
1-amino-8-phenylsulfitonaphthalene-3,6-disulfonic acid,
1-amino-2-hydroxy-4-nitrobenzene,
2-(2'-methyl-4'-aminophenylazo)-naphthalene-6,8-disulfonic acid and the like.

This enumeration illustrates the wide variety of diazotizable primary arylamines which can be used and we do not intend to limit ourselves thereto.

Illustrative of the arylaminoalkylsilanes that can be used as coupling components in this invention are inter alia:

N-(gamma-trimethylsilylpropyl)-aniline,
N-methyl-N-(gamma-trimethylsilylpropyl)-aniline,
N,N-di-(gamma-trimethylsilylpropyl)-aniline,
N-(delta-trimethylsilylbutyl)-2-methoxyaniline,
N-(gamma-triethylsilylpropyl)-2,5-dichloroaniline,
N-(gamma-trimethylsilylpropyl)-3-nitroaniline,
N-(gamma-trimethylsilylpropyl)-alpha-naphthylamine,
N-(gamma-trimethylsilylpropyl)-alpha-naphthalamine-5-sulfonic acid,
N-(gamma-trimethylsilylpropyl)-alpha-naphthalamine-3,6-disulfonic acid,
N-methyl-N-(gamma-triethoxysilylpropyl)-aniline,
N-(gamma-triethoxysilylpropyl)-aniline,
N-(delta-triethoxysilylbutyl)-3-nitroaniline,
N-(gamma-methyldiethoxysilylpropyl)-aniline,
N-(gamma-dimethylethoxysilylpropyl)-anline,
N-(gamma-triethoxysilylpropyl)-alpha-naphthylamine,
N(delta-dimethylethoxysilylbutyl)-2,5-dichloroamine, and the like.

The new dyestuffs are made by methods known to be suitable for the manufacture of dyestuffs. For example, the primary aromatic amino compound is diazotized and the diazonium salt is then slowly added to a cold solution of the arylaminoalkylsilane to produce the dyestuff; or the arylaminoalkylsilane may be slowly added to the diazonium salt.

When a functional arylaminoalkylsilane is used, that is, one containing alkoxy or aryloxy radicals attached to the silicon atom, as coupling component, the monomeric silane azo dyestuff must be produced in a substantially anhydrous medium to prevent hydrolysis and formation of siloxane azo dyestuffs. Such procedures are known in the art; and among the anhydrous organic solvents which may be used are dioxane, glacial acetic acid, dimethylformamide, 2-methoxyethanol, ethylene glycol, and the like. When the arylaminoalkylsilane is nonfunctional, the coupling reaction may be carried out in aqueous medium or in anhydrous medium. The dyestuffs produced from functional arylaminoalkylsilanes under anhydrous conditions may be hydrolyzed to produce polysiloxane dyestuffs. Such polysiloxane dyestuffs, however, are the subject matter of another patent application filed by the same inventors.

The shades of the dyestuffs produced can be varied according to the particular components selected to produce the dyestuff. Colors ranging from yellows to oranges, reds and blues can thus be obtained, which are suitable for dyeing cotton, wool, silk, glass cloth, nylon, acetate and viscose. If the dyestuff is free of water-solubilizing groups, the colored compounds can be used as pigments for paints and oils.

The silicon-containing silane azo dyestuffs of this invention have solubility characteristics similar to the analogous dyestuffs prepared using the same diazo component and the corresponding silicon-free amine coupling component. The dyestuffs have sufficient solubility to dye the cloth or yarn from an aqueous dyebath solution. However, anhydrous solvent solutions may used. Satisfactory dyeings are also obtainable from suspensions. Small amounts of dye assistants such as an alcohol, or pyridine, or dimethylformamide can be added to the dye bath to assist in obtaining satisfactory dyeings.

Metallic complexes of the dyestuffs of this invention can also be produced. For example, dianisidine tetrazo can be coupled in acidic medium with one equivalent of an arylaminoalkylsilane; the second diazonium group can then be coupled in alkaline medium with 8-acetylamino-1-hydroxynaphthalene-3,6-disulfonic acid. The dyestuff obtained can be represented by the following structure:

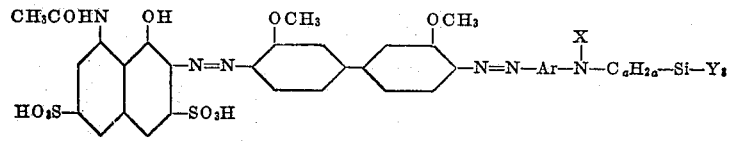

wherein Ar, X, Y and (a) have the same meanings as hereinbefore indicated. This dyestuff can then be treated with salts of Cr, Mn, Fe, Co, Ni, Cu, Cd, Pb, Sn and Zn to form the metal complexes by procedures well known to those versed in the art of preparing metallized dyestuffs and pigments. The carboxyl and sulfonyl containing dyestuffs of this invention can be obtained either in the free acid form or as the alkali metal salts thereof.

A typical example of this invention is the preparation of the dyestuff represented by the formula:

This dyestuff was produced by dissolving 1.24 g. of anthranilic acid in 4 ml. of water and 1 ml. of 30% hydrochloric acid by warming to about 60° C. Then about 5 g. of ice and 1.64 ml. of 30% hydrochloric acid were added to the solution and the mixture was cooled in an ice bath to −5° C. To this solution, at −5° to 3° C., there was gradually added, while stirring, a solution of 0.7 g. of sodium nitrite in about 4 ml. of water below the surface of the reaction. Then at about 0° C. slowly added 2.05 g. of N-methyl-N-(gamma-trimethylsilylpropyl)-aniline in a dropwise manner, and stirred for one hour. Added a solution of 0.37 g. of sodium acetate solution to the reaction mixture and stirred another 24 hours allowing the temperature to rise to room temperature. Neutralized with 5% sodium hydroxide solution to a pH of about 7 as indicated on Universal Indicator Paper, and let stand to crystallize. The deep red solid dyestuff was filtered, washed with water, then with 10% acetic acid solution and then with water again. The crystals were dried at room temperature, dissolved in boiling methanol and the solution was filtered. The filtrate was allowed to cool slowly and after 48 hours at room temperature the red dyestuff crystals were filtered off, washed with cold methanol and air dried. Yield was 0.3 g. A highly purified analytical sample had a Si content of 7.0% and a N content of 10.9%. The theoretical values for $C_{20}H_{27}O_2N_3Si$ are Si, 7.6% and N, 11.4%.

This dyestuff was used to dye acetate, nylon, cotton, silk, viscose, wool, and sized and unsized glass cloth from a dyebath consisting of 0.01 g. of the dyestuff in 5 ml. of methanol and 0.05 ml. of pyridine. The test fabrics were dyed by allowing them to stand in the dye bath at about 25° C. overnight. They were then removed, washed with water and dried. It was also possible to dye these fibers from an aqueous bath at elevated temperatures according to conventional procedures well known in the trade.

An example illustrating the production of a dyestuff containing functional radicals under substantially anhydrous conditions is the preparation of the dyestuff represented by the formula:

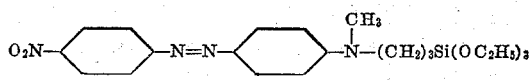

This dyestuff was produced by diazotizing 0.01 mole of p-nitroaniline as follows: A solution of 1.38 g. of p-nitroaniline in 10 ml. of dimethylformamide and 15 ml. of 2 molar hydrogen chloride in glacial acetic acid was diazotized at about 5° to 10° C. by the slow addition of 10 ml. of a molar solution of sodium nitrite in ethylene glycol. During the diazotization crystals of the diazonium chloride separated. Precipitation was completed by the addition of cooled dioxane and the diazonium salt was then filtered and washed on the funnel with dioxane. This was dissolved in 5 ml. of glacial acetic acid and cooled to about 5° C. A solution of 2.8 ml. (0.0093 mole) of N-methyl-N-(gamma-triethoxysilylpropyl)-aniline in 5 ml. of glacial acetic acid was added to the diazonium solution and a deep red, viscous liquid formed which gradually solidified. The crystals were filtered and dried in a desiccator.

What is claimed is:
1. Silane azo dyestuffs containing the groups represented by the following formula:

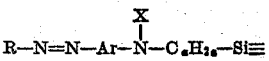

wherein R represents a member selected from the group consisting of aryl radicals and substituted aryl radicals; Ar represents a member selected from the group consisting of arylene radicals and substituted arylene radicals; X represents a member selected from the group consisting of hydrogen atoms and akyl radicals; and (a) is an integer having a value of at least 3.

2. Silane dyestuffs represented by the general formula:

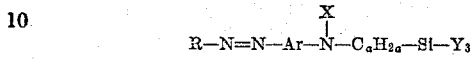

wherein R represents a member selected from the group consisting of aryl radicals, and chlorine-, hydroxy-, methoxy-, lower alkyl-, methyl-, sulfo-, sulfonic acid amide-, unsubstituted arylazo-, substituted arylazo-, phenyl-, nitro- and acylamino-substituted aryl radicals; Ar represents a member selected from the group consisting of arylene radicals, and lower alkyl-, alkoxy-, nitro-, halogen- and sulfo-substituted arylene radicals; X represents a member selected from the group consisting of a hydrogen atom and an alkyl radical; Y represents a member selected from the group consisting of alkyl radicals, aryl radicals, alkoxy radicals and aryloxy radicals; and (a) is an integer having a value of at least 3.

3. The silane azo dyestuff represented by the formula:

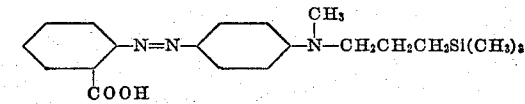

4. The silane azo dyestuff represented by the formula:

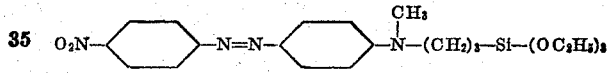

5. The method of dyeing fibrous material, which comprises exposing said fibrous material to a dye bath containing a silane azo dyestuff which can be represented by the general formula:

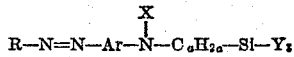

wherein R, Ar, X, Y and (a) have the same meanings as claimed in claim 2, at an elevated temperature, rinsing and drying.

6. A fiber dyed with a silane azo dyestuff of claim 1.
7. Glass fiber dyed with a silane azo dyestuff of claim 1.

References Cited in the file of this patent
UNITED STATES PATENTS

| | | |
|---|---|---|
| 2,317,965 | Bestian et al. | Apr. 27, 1943 |
| 2,715,133 | Speier | Aug. 9, 1955 |
| 2,778,746 | Steinman | Jan. 22, 1957 |
| 2,832,754 | Jex | Apr. 29, 1958 |
| 2,849,333 | Kingsbury | Aug. 26, 1958 |